United States Patent [19]
Park

[11] Patent Number: 6,002,942
[45] Date of Patent: Dec. 14, 1999

[54] METHOD FOR CONTROLLING TRANSMITTING POWER OF A MOBILE STATION

[75] Inventor: Hyun-Chul Park, Euiwang, Rep. of Korea

[73] Assignee: SamSung Electronics Co., Ltd., Kyungki-do, Rep. of Korea

[21] Appl. No.: 08/885,736

[22] Filed: Jun. 30, 1997

[30] Foreign Application Priority Data

Jun. 28, 1996 [KR] Rep. of Korea ..................... 96-25245

[51] Int. Cl.$^6$ ..................................... H04B 7/00
[52] U.S. Cl. ..................... 455/522; 455/69; 455/38.3
[58] Field of Search ................................. 455/38.3, 67.1, 455/68, 69, 422, 522, 572, 70

[56] References Cited

U.S. PATENT DOCUMENTS

| | | | |
|---|---|---|---|
| 5,267,262 | 11/1993 | Wheatley, III | 455/38.3 |
| 5,278,992 | 1/1994 | Su et al. | 455/522 |
| 5,390,165 | 2/1995 | Tuch | 455/69 |
| 5,551,057 | 8/1996 | Mitra | 455/69 |
| 5,590,409 | 12/1996 | Sawahashi | 455/69 |

*Primary Examiner*—Nguyen Vo
*Assistant Examiner*—Greta J. Fuller
*Attorney, Agent, or Firm*—Robert E. Bushnell, Esq.

[57] ABSTRACT

A method for controlling a transmitting power of a mobile station radio communicating with a base station is disclosed including the step of: adjusting the transmitting power of the mobile station by use of an average value of a power strength received over a predetermined period during communication, a transmitting power of the base station analyzed from a packet which is transmitted from the base station, and a transmitting power determined by a desired receiving power of the base station.

10 Claims, 3 Drawing Sheets

6,002,942

METHOD FOR CONTROLLING TRANSMITTING POWER OF A MOBILE STATION

CLAIM OF PRIORITY

This application makes reference to, incorporates the same herein, and claims all benefits accruing under 35 U.S.C. §119 from an application for Method For Controlling Transmitting Power Of Mobile Station earlier filed in the Korean Industrial Property Office on the 28th day of June 1996 and there duly assigned Serial No. 25245/1996, a copy of which application is annexed hereto.

BACKGROUND OF THE INVENTION

1. Field of the Invention

The present invention relates to a mobile station radio-communicating with a base station and, more particularly, to a method for controlling a transmitting power of the mobile station.

2. Description of the Related Art

In a conventional mobile station, even though the strength of a receiving power varies according to a moving position, a transmitting power determined during initial subscription procedure is maintained. Therefore, the conventional mobile station has a problem in that optimal communication can not be done.

SUMMARY OF THE INVENTION

It is an object of the present invention to provide a method for calculating an average value of a receiving power received to a mobile station for a predetermined time.

It is another object of the present invention to provide a method for determining a transmitting power of a mobile station during subscription procedure.

It is still another object of the present invention to provide a method for automatically controlling a transmitting power after subscription procedure is ended.

According to one feature of the present invention, a method for controlling a transmitting power of a mobile station radio-communicating with a base station adjusts the transmitting power of the mobile station by use of an average value of a power strength received over a predetermined period during communication, a transmitting power of the base station analyzed from a packet which is transmitted from the base station, and a transmitting power determined by a desired receiving power of the base station.

The present invention will be more specifically described with reference to the attached drawings.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings, in which like reference symbols indicate the same or similar components, wherein.

DETAILED DESCRIPTION OF THE PREFERRED EMBODIMENT(S)

Figure 1:
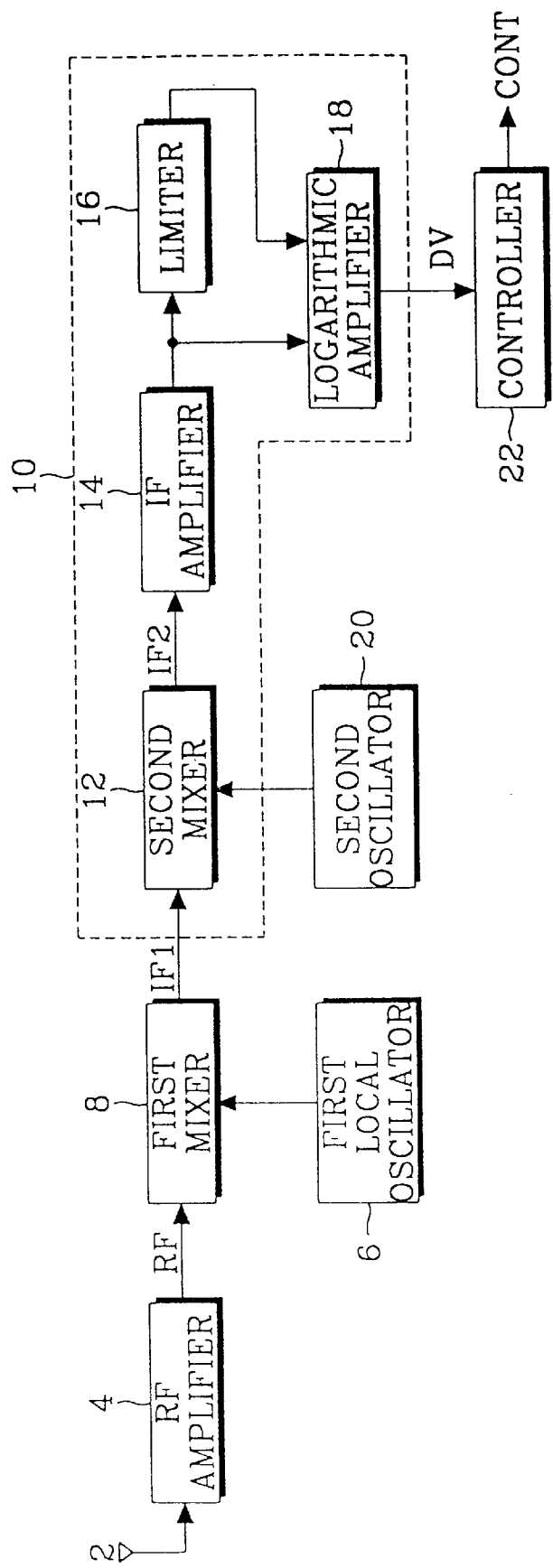
FIG. 1 is a block diagram showing a construction according to the principles of the present invention.

Referring to FIG. 1, a radio signal received through an antenna 2 is amplified by a radio frequency (RF) amplifier 4. The amplified signal is mixed by a first mixer 8 with a signal oscillated from a first local oscillator 6 to generate a first intermediate frequency (IF) signal. The first IF signal is mixed by a second mixer 12 with a signal oscillated from a second local oscillator 20 to generate a second IF signal. The second IF signal is amplified by an IF amplifier 14. An amplitude of the amplified second IF signal is limited by a limiter 16. Typically, a signal generated from the limiter 16 is provided to the user. A logarithmic amplifier 18 converts the current magnitude of signals generated from the IF amplifier 14 and the limiter 16 to a direct current (DC) voltage DV. A controller 22 measures a received signal strength indicator (RSSI) value received to a mobile station by using the DC voltage DV. The controller 22 determines a transmitting power by measuring the RSSI value and generates a control signal CONT for controlling the transmitting power.

Figure 2:
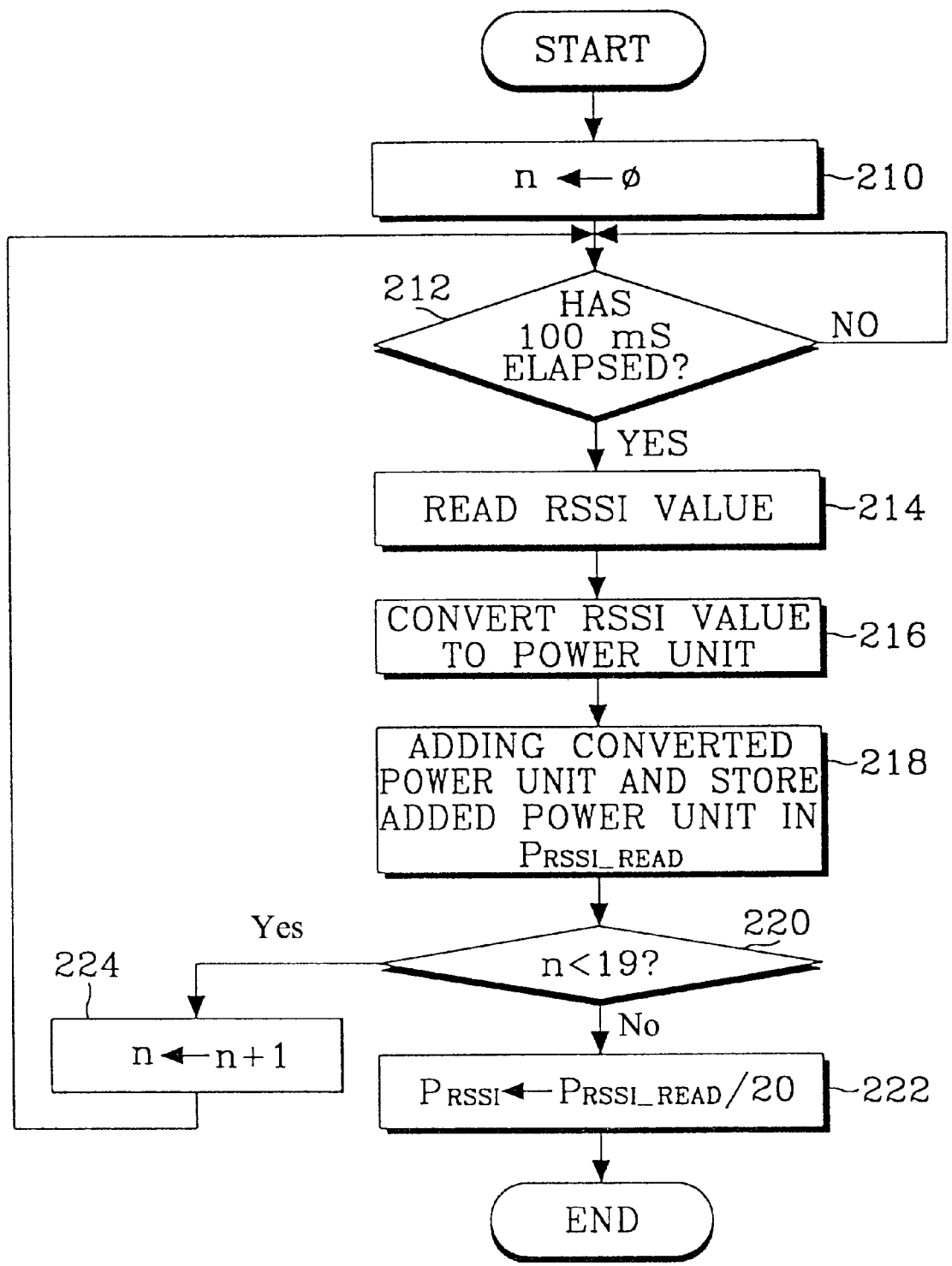
FIG. 2 is a flow chart for calculating an average value of a receiving power according to the principles of the present invention.

FIG. 2 illustrates a control flow for determining the RSSI value. Referring to FIG. 2, there are provided steps of: reading the RSSI value received over a predetermined period (100 ms) and converting the received RSSI value to a power unit: accumulatively adding the converted power; and calculating an average value of the added power for a predetermined time (2 seconds).

Figure 3:
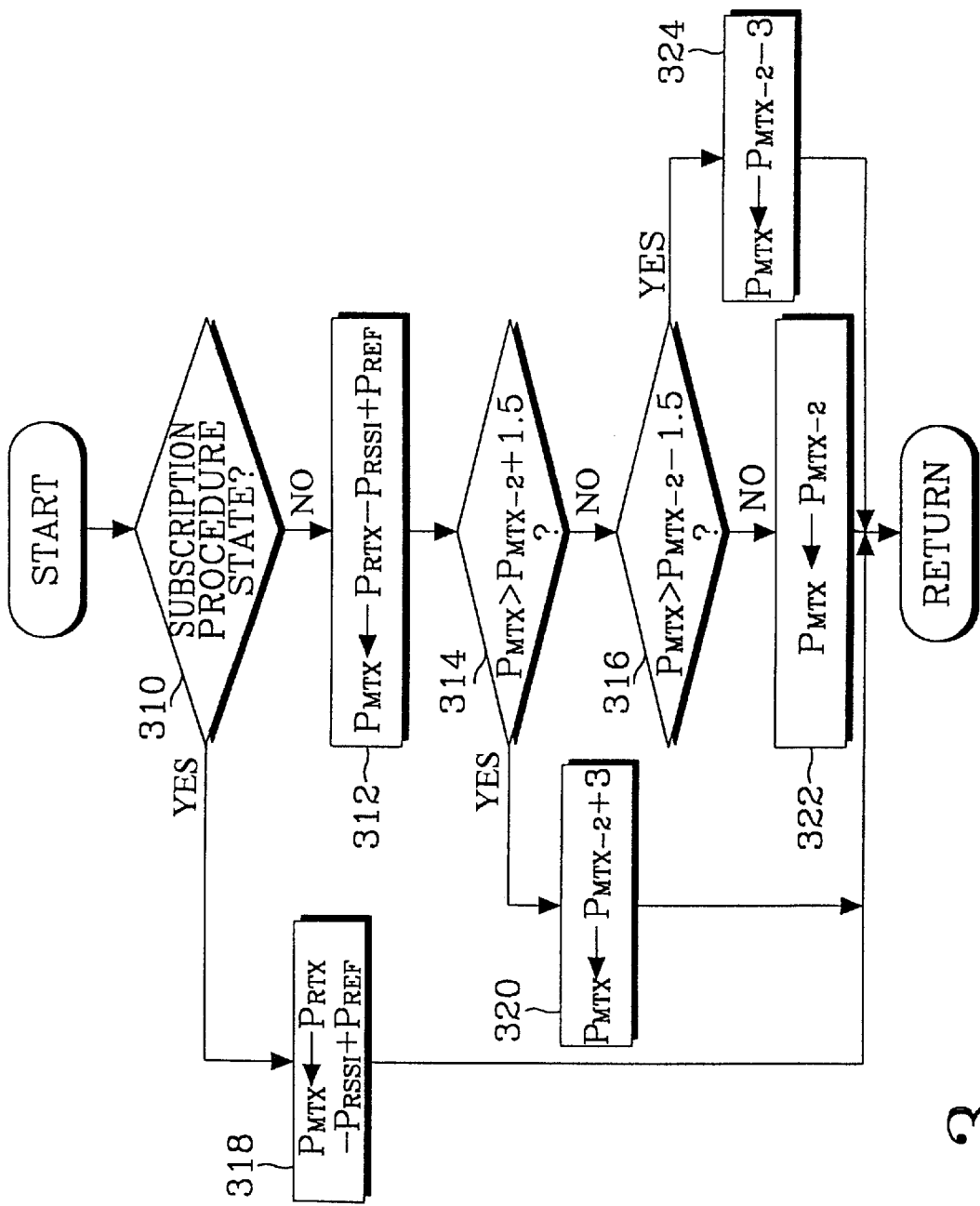
FIG. 3 is a flow chart for calculating a transmitting power according to the principles of the present invention.

FIG. 3 illustrates a control flow for determining the transmitting power. Referring to FIG. 3, there are provided steps of: when the mobile station is in a subscription procedure state, setting the transmitting power of the mobile station to an initial value; and when subscription procedure is ended, comparing the transmitting power of the mobile station with that before a predetermined time (2 seconds) and adjusting the transmitting power according to a compared variation width.

A series of processes for obtaining the average value of a receiving power will now be described in detail with reference to FIG. 2.

Controller 22 sets a count value n to "0" at step 210 in order to count the number, 20 for example, of a predetermined period (100 ms) within a predetermined time (2 seconds). At step 212, controller 22 checks whether the predetermined period (100 ms) has elapsed by checking an internal timer. If the predetermined period has elapsed, controller 22 reads the RSSI value at step 214. The RSSI value is provided by the DC voltage DV of logarithmic amplifier 18. At step 216, controller 22 converts the RSSI value to a power unit.

The following Table 1 shows the power unit corresponding to the DC voltage DV generated from logarithmic amplifier 18.

TABLE 1

| DC voltage (DV) [V] | Power unit [dBm] |
|---|---|
| 0.5 | −120 |
| 1.0 | −110 |
| 1.5 | −100 |
| 2.0 | −90 |
| 2.5 | −80 |
| 3.0 | −70 |
| 3.5 | −60 |
| 4.0 | −50 |

TABLE 1-continued

| DC voltage (DV) [V] | Power unit [dBm] |
| --- | --- |
| 4.5 | −40 |
| 5.0 | −30 |
| 5.5 | −20 |
| 6.0 | −10 |

At step 218, the converted power unit is accumulatively added to that before the predetermined period and the added power unit is stored in a temporary buffer $P_{RSSI\_READ}$. At step 220, controller 220 checks whether the count value n is less than 19 in order to see if the predetermined time (2 seconds) has elapsed. If the count value n is less than 19, that is, if the predetermined time (2 seconds) has not elapsed, controller 22 increases the count value by 1 at step 224 and returns to step 212. If the count value is greater than or equal to 19, that is, if the predetermined time (2 seconds) has elapsed, the controller 22 calculates, at step 222, the average value of the power received for the predetermined time (2 seconds) by dividing the receiving power accumulatively stored in the temporary buffer $P_{RSSI\_READ}$ by 20.

The average value of the receiving power can be represented by $P_{RSSI=PRSSI\_READ}/n$, where n in the present case is equal to 20.

The calculated average value is stored in the temporary buffer. The total processes shown in FIG. 2 are executed over a period of 2 seconds (=100 ms×20).

A series of processes for determining the transmitting power will now be described with reference to FIG. 3. At step 310, controller 22 checks whether the mobile station is in a subscription procedure state. The subscription procedure is a procedure initially carried out in order to communicate with the base station. If the mobile station is in the subscription procedure state, controller 22 determines an initial transmitting power at step 318. The transmitting power is determined by the following equation:

$$P_{MTX} = P_{RTX} - P_{RSSI} + P_{REF}$$

wherein, $P_{MTX}$ is a transmitting power of the mobile station, $P_{RTX}$ is a transmitting power of the base station, $P_{RSSI}$ is a receiving power of the mobile station, and $P_{REF}$ is a desired receiving power of the base station. Generally, if the bit error rate BER is $10^{-4}$, then $P_{REF}$ is −105 dBm.

Controller 22 checks whether the subscription procedure is being carried out over the predetermined period (2 seconds). When the subscription procedure is ended, controller 22 calculates, at step 312, the transmitting power $P_{MTX}$ after the subscription procedure. The calculated equation is the same as the equation for calculating the initial transmitting power. However, the average value $P_{RSSI}$, of the receiving power is a variation value.

When the transmitting power $P_{MTX}$ of the mobile station is determined, controller 22 compares the determined transmitting power $P_{MTX}$ with a transmitting power $P_{MTX-2}$, before the predetermined time (2 seconds) at steps 314 and 316. When a compared variation width of the transmitting power is greater than a setting width 1.5 dBm, that is, when $P_{MTX>PMTX-2}+1.5$ dBm, step 314 is followed by step 320 to increase the transmitting power $P_{MTX}$ of the mobile station by 3 dBm ($P_{MTX}=P_{MTX-2}+3$ dBm), otherwise, step 314 is followed by step 316. When the variation width is less than the setting width 1.5 dBm, that is, when $P_{MTX}>P_{MTX-2}-1.5$ dBm, step 316 proceeds to step 324 to decrease the transmitting power $P_{MTX}$ by 3 dBm ($P_{MTX}=P_{MTX-2}-3$ dBm).

When the variation width of the transmitting power within the predetermined time (2 seconds) ranges from −1.5 dBm to +1.5 dBm, controller 22 maintains the transmitting power before the predetermined time (2 seconds) at step 322, that is, ($P_{MTX}=P_{MTX-2}$)

As described above, during the subscription procedure, the controller changes the transmitting power after a predetermined time. After the subscription procedure is ended, the transmitting power is changed stage by stage. Consequently, since the transmitting power necessary for communication is automatically controlled, the effects of communication can be improved.

It should be understood that the present invention is not limited to the particular embodiment disclosed herein as the best mode contemplated for carrying out the present invention, but rather that the present invention is not limited to the specific embodiments described in this specification except as defined in the appended claims.

What is claimed is:

1. A method for controlling a transmitting power of a mobile station radio-communicating with a base station, said method comprising the step of:

determining an average value of a power strength received over a predetermined period during communication;

analyzing a transmitting power of said base station from a packet which is transmitted from said base station;

determining a transmitting power according to a desired receiving power of said base station;

summing of said transmitting power, resulting from said analyzing step, of said base station and said desired receiving power of said base station; and adjusting the transmitting power of said mobile station by subtracting said average value of the received power strength from the result of said summing step.

2. The method as claimed in claim 1, wherein said average value of the received power strength is determined by dividing a sum of the power strength received over a setting number for a predetermined time by said setting number.

3. The method as claimed in claim 2, further comprising the steps of:

determining whether said mobile station is operating in a subscription procedure state; and setting an initial transmitting power of said mobile station by said step of adjusting the transmitting power of said mobile station when it is determined that said mobile station is operating in said subscription procedure state.

4. The method as claimed in claim 2, further comprising the steps of:

determining whether said mobile station is finished operating in a subscription procedure state;

setting a transmitting power of said mobile station by said step of adjusting, when it is determined that said mobile station is finished operating in said subscription procedure state; and comparing the transmitting power, set during said step of setting, with an initial transmitting power determined before said predetermined time, and readjusting the transmitting power of said mobile station according to a compared variation width.

5. The method as claimed in claim 4, wherein said readjusting step adjusts said transmitting power of said mobile station by increasing or decreasing by a predetermined stage when said compared variation width increases or decreases by a predetermined level or more, and maintains said transmitting power determined through said step of subtracting, when the subscription procedure state is finished, when said compared variation width is within said predetermined level.

6. A method for controlling a transmitting power of a mobile station radio-communicating with a base station, said method comprising the steps of:

determining an average value of a power strength received from said base station by dividing the sum of the power strength received over a setting number for a predetermined time by said setting number;

determining the transmitting power of said mobile station by subtracting said average value from the sum of a transmitting power of said base station and a desired receiving power of said base station; and comparing the transmitting power determined through said step of determining the transmitting power of said mobile station by subtracting said average value from the sum of a transmitting power of said base station and a desired receiving power of said base station with a transmitting power determined before said predetermined time, and adjusting said transmitting power of said mobile station according to a compared variation width.

7. The method as claimed in claim 6, wherein said transmitting power of said base station and said desired receiving power of said base station are determined by analyzing a packet transmitted from said base station.

8. The method as claimed in claim 6, wherein said step of determining the transmitting power of said mobile station by subtracting said average value from the sum of a transmitting power of said base station and a desired receiving power of said base station is performed in case that said mobile station is in a subscription procedure state, and wherein said step of comparing is repeatedly performed over a predetermined period while communication is implemented by completing subscription procedure of said mobile station.

9. The method as claimed in claim 8, wherein said step of comparing adjusts said transmitting power of said mobile station by increasing or decreasing by a predetermined stage if said compared variation width increases or decreases by a predetermined level or more, and maintains said transmitting power determined through said step (b) if said compared variation width is within said predetermined level.

10. A method for controlling a transmitting power of a mobile station, said method comprising the steps of:

setting a count value equal to zero;

waiting for a first predetermined time period to elapse;

reading a received RSSI value once said first predetermined time period has elapsed;

converting said received RSSI value to a power unit value;

determining a summed power unit value by summing power unit values converted over a second predetermined time period;

determining whether said count value is less than a predetermined count value;

increasing said count value by 1 (one) when it is determined that said count value is less than said predetermined count value and returning to said step of waiting;

determining an average power unit value by averaging said summed power unit values by dividing by a value corresponding to said predetermined count value plus 1 (one), wherein said predetermined count value plus 1 (one) corresponds to said second predetermined time period;

analyzing a transmitting power of said base station from a packet which is transmitted from said base station;

determining a transmitting power according to a desired receiving power of said base station; and determining an adjusted transmitting power by adjusting the transmitting power of said mobile station by subtracting said average power unit value from said transmitting power of said base station analyzed from said packet which was transmitted from said base station and adding said transmitting power determined by said desired receiving power of said base station.

* * * * *